United States Patent [19]

Kiyota et al.

[11] Patent Number: 5,201,384
[45] Date of Patent: * Apr. 13, 1993

[54] MOTORCYCLE HAVING BODY HEIGHT ADJUSTING MECHANISM

[75] Inventors: Satoshi Kiyota; Tomomi Machii, both of Hamamatsu, Japan

[73] Assignees: Suzuki Kabushiki Kaisha, Japan; Kabushiki Kaisha Showa Seisakusho, Japan

[*] Notice: The portion of the term of this patent subsequent to Feb. 11, 2009 has been disclaimed.

[21] Appl. No.: 604,561

[22] Filed: Oct. 26, 1990

[30] Foreign Application Priority Data

Oct. 26, 1989 [JP] Japan ................................. 1-277153
Oct. 30, 1989 [JP] Japan ................................. 1-279961
Oct. 31, 1989 [JP] Japan ................................. 1-281690

[51] Int. Cl.$^5$ ...................... B60G 17/02; B62K 21/18
[52] U.S. Cl. .................................. 180/219; 280/707; 280/840
[58] Field of Search ............... 180/219; 280/702, 707, 280/709, 714

[56] References Cited

U.S. PATENT DOCUMENTS

| | | | |
|---|---|---|---|
| 4,212,484 | 7/1980 | Fujii | 280/707 |
| 4,422,661 | 12/1983 | Kawamura | 280/707 X |
| 4,568,101 | 2/1986 | Bleustein et al. | 280/707 |
| 4,815,758 | 3/1989 | Yoshida | 280/840 |
| 5,086,866 | 2/1992 | Banjo et al. | 180/219 |

FOREIGN PATENT DOCUMENTS

3930966 3/1990 Fed. Rep. of Germany ...... 180/219
1-95194 8/1989 Japan ................................. 180/219

Primary Examiner—Mitchell J. Hill
Attorney, Agent, or Firm—Bruce L. Adams; Van C. Wilks

[57] ABSTRACT

A motorcycle is provided with a body height adjustor capable of adjusting the body height of the motorcycle by changing lengths of front suspensions and a rear cushion unit. The body height adjustor includes a first hydraulic jack for the front suspensions, a second hydraulic jack for the rear cushion unit, and a body height adjusting unit to transmit hydraulic fluid pressure in the rear cushion unit to the first and second hydraulic jacks through hydraulic hoses connected to a hose connector. The hose connector comprises a front fork side joint member and a body height adjusting unit side joint member each including a cylinder and a free piston movable in the corresponding cylinder by the pressure of the hydraulic fluid passing through the hydraulic hoses. The body height adjustor has a body height changeover valve comprised of a spool valve and a blow valve connected to the spool valve and operated to be opened by the increase of pressure in the hydraulic jacks and the hydraulic hoses. The blow valve is also opened by the operation of the sidestand of the motorcycle.

9 Claims, 8 Drawing Sheets

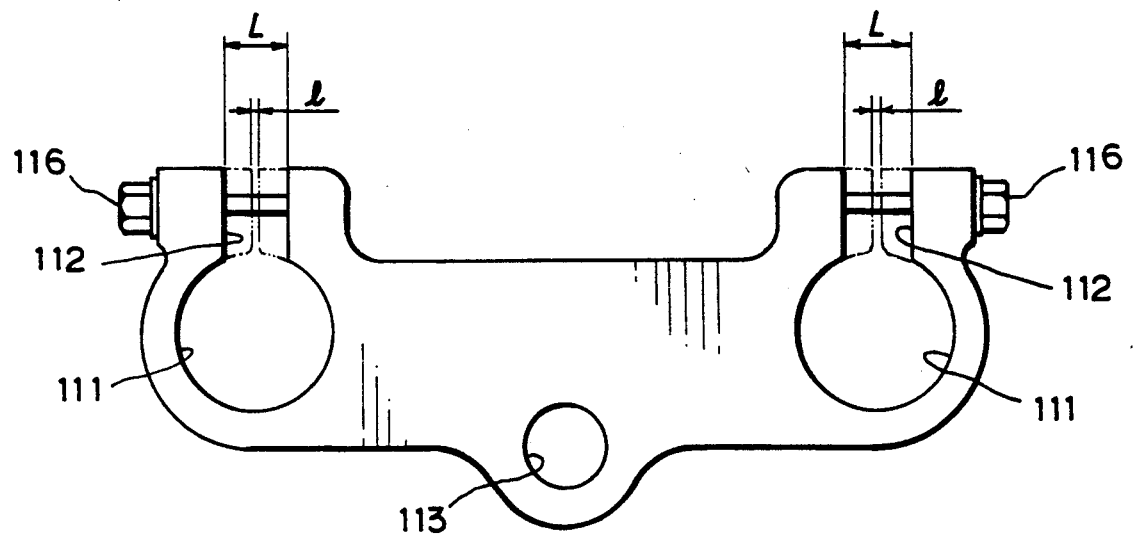
F I G. 9A
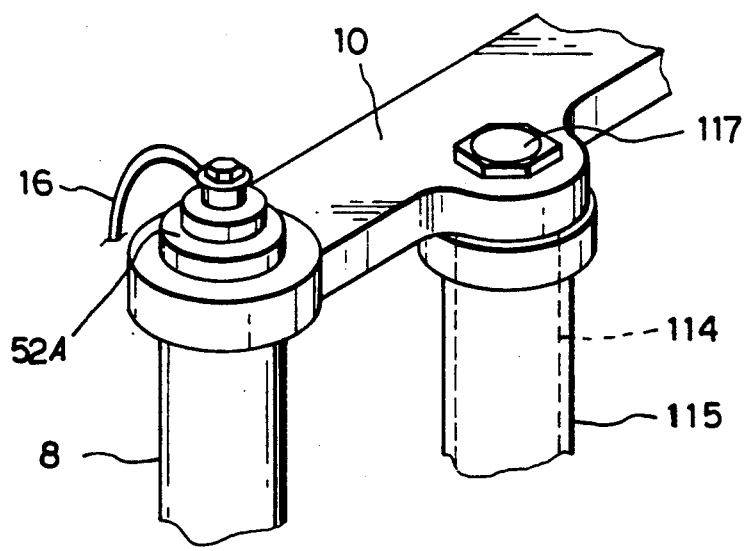
F I G. 9B

MOTORCYCLE HAVING BODY HEIGHT ADJUSTING MECHANISM

BACKGROUND OF THE INVENTION

This invention relates to a motorcycle provided with a body height adjusting mechanism for adjusting the body height of the motorcycle by changing the lengths of front suspensions and a rear cushion unit.

A motorcycle is provided with a body height adjustor with which the rider can change the height of the body of the motorcycle by using front suspensions and a rear cushion unit.

The height adjustor includes hydraulic hoses used for connection between front suspensions and a body height adjusting unit and between the body height adjusting unit and a rear cushion unit, and hydraulic fluid, i.e. pressure oil, is supplied to or discharged from hydraulic jacks of the front suspensions and the rear cushion unit through the hydraulic hoses to simultaneously change the lengths of the front suspensions and the rear cushion unit.

In the body height adjustor of the type described above, hydraulic hoses are connected to the front suspensions through fork caps. Therefore, when the front fork constituted by the front suspensions is mounted on the body frame in the assembly factory, the upper bracket cannot be placed in a predetermined position after the steering shaft has been passed through the head pipe of the body frame, unless the fork caps are temporarily detached or removed from the front suspensions.

If the fork caps are temporarily detached, there is the risk of a change in the amount of pressure oil in the front suspensions as well as the risk of foreign matters being mixed in the pressure oil.

Furthermore, a motorcycle provided with a body height adjustor of the type described above is constructed so that the motorcycle can be stably stopped when a sidestand is raised with the body height being in "low" condition. However, there is a case where a rider operates the sidestand in the standing condition with the body height being in "high" condition without changing to the "low" condition. In such a case, the inclination of the motorcycle body increases and the stationary stopping condition of the motorcycle is made unstable and in an adverse case, the motorcycle may be overturned.

SUMMARY OF THE INVENTION

An object of this invention is to substantially eliminate the defects or drawbacks encountered in the prior art described above and to provide a motorcycle having a body adjustable in height and capable of accurately adjusting the body height by changing the lengths of the front suspensions and the rear cushion unit.

Another object of this invention is to provide a body height adjustor of a motorcycle provided with a hose connector capable of stably operating the amount of the hydraulic fluid in the front suspensions.

A further object of this invention is to provide a body height adjustor capable of stably adjusting the body height in accordance with the attitude of the sidestand of the motorcycle.

A still further object of this invention is to provide body height adjustor of a motorcycle provided a with an upper bracket capable of improving the assembly and disassembly working of the body height adjustor and preventing the air confusing into the hydraulic hose.

These and other objects can be achieved according to this invention, in one aspect, by providing a motorcycle having a body adjustable in height comprising a pair of front suspensions mounted to a front fork supported rotatably by a frame of a motorcycle body, the front fork supporting a front wheel in a shock absorbing manner, a rear cushion unit supported by the body frame, the rear cushion unit supporting a rear wheel in a shock absorbing manner, an engine unit mounted to the body frame to drive and rotate the rear wheels and a body height adjustor capable of adjusting the body height of the motorcycle by changing lengths of the front suspensions and the rear cushion unit, the body height adjustor including, a first hydraulic jack provided for the front suspensions, a second hydraulic jack provided for the rear cushion unit, and a body height adjusting unit adapted to transmit hydraulic pressure of hydraulic fluid in the rear cushion unit to the first and second hydraulic jack through hydraulic hoses connected to a hose connector, the hose connector comprising two dividable parts, one being a front fork side joint member comprised of a piston-cylinder assembly and the other being a body height adjusting unit side joint member comprised of a piston-cylinder assembly, the piston-cylinder assemblies each including a cylinder and a free piston movable in the cylinder by the hydraulic pressure of the hydraulic fluid passing through the hydraulic hoses.

In another aspect according to this invention, the motorcycle is characterized by the body height adjusting unit including a body height changeover valve means including a rotary valve and blow valve means operatively connected to the rotary valve and operated to be opened by increase of pressure in the hydraulic jacks and the hydraulic hoses, the blow valve means also being opened by operation of the sidestand.

In a further aspect according to this invention, the motorcycle is characterized by the upper bracket mounted to the front fork which is provided with front suspension support portions having slits each having a width sufficient for passing said hydraulic hose.

According to the motorcycle having the body height adjustors of the aspects and characters described above, the hydraulic hose is connected to the front fork through a fork cap to introduce the hydraulic fluid to the hydraulic jack of the front suspension. In the hose connector of the body height adjustor according to this invention, the joint on the front fork side and the joint on the body height adjusting unit side can be separated from each other while preventing, by the pistons disposed in the cylinders of the two joints, the hydraulic fluid in the hydraulic hoses from flowing out. When the joint on the front fork side and the joint on the body height adjusting unit side are separated, the upper bracket can be placed in a predetermined position to mount the front fork on the frame without removing the fork cap, thereby improving the facility with which the body height adjustor is mounted. At this time, there is no risk of a change in the amount of the hydraulic fluid and no risk of mixing of a foreign matter since the hydraulic fluid in the front suspension does not flow out.

In addition, according to the body height adjustor of the motorcycle of this invention, the hydraulic fluid in the hydraulic hose and hydraulic jack is discharged by opening the blow valve when the motorcycle is stopped by the standing operation of the sidestand. At this time, the initial loads of the front suspensions and the rear cushion unit are lowered, thus making the body height in the "low" condition without failure, thereby making small the inclination of the motorcycle body at the motorcycle stopping time and thus, improving the stability of the motorcycle attitude in the stopping state.

Furthermore, the upper bracket of the motorcycle of this invention is provided with the front suspension support portions as holes having slits each having a width sufficient for passing the hydraulic hose. Accordingly, when the front fork composed of the front suspensions is assembled with or disassembled from the body frame, the upper bracket can be attached to or removed from the front fork by passing the hydraulic hoses through the slits, thus eliminating the disassembling of the fork caps from the front suspensions. This also eliminates the risk of mixing the air into the hydraulic hoses.

BRIEF DESCRIPTION OF THE DRAWINGS

For a better understanding of this invention and to show how the same is carried out, reference is now made, by way of preferred embodiments, to the accompanying drawings, in which:

FIG. 9A is a plan view showing an upper bracket utilized for the body height adjustor according to this invention; and FIG. 9B is a perspective view, partially shown, of the upper bracket shown in FIG. 9A and a front fork of the motorcycle in an assembled condition.

DESCRIPTION OF THE PREFERRED EMBODIMENTS

Figure 1:
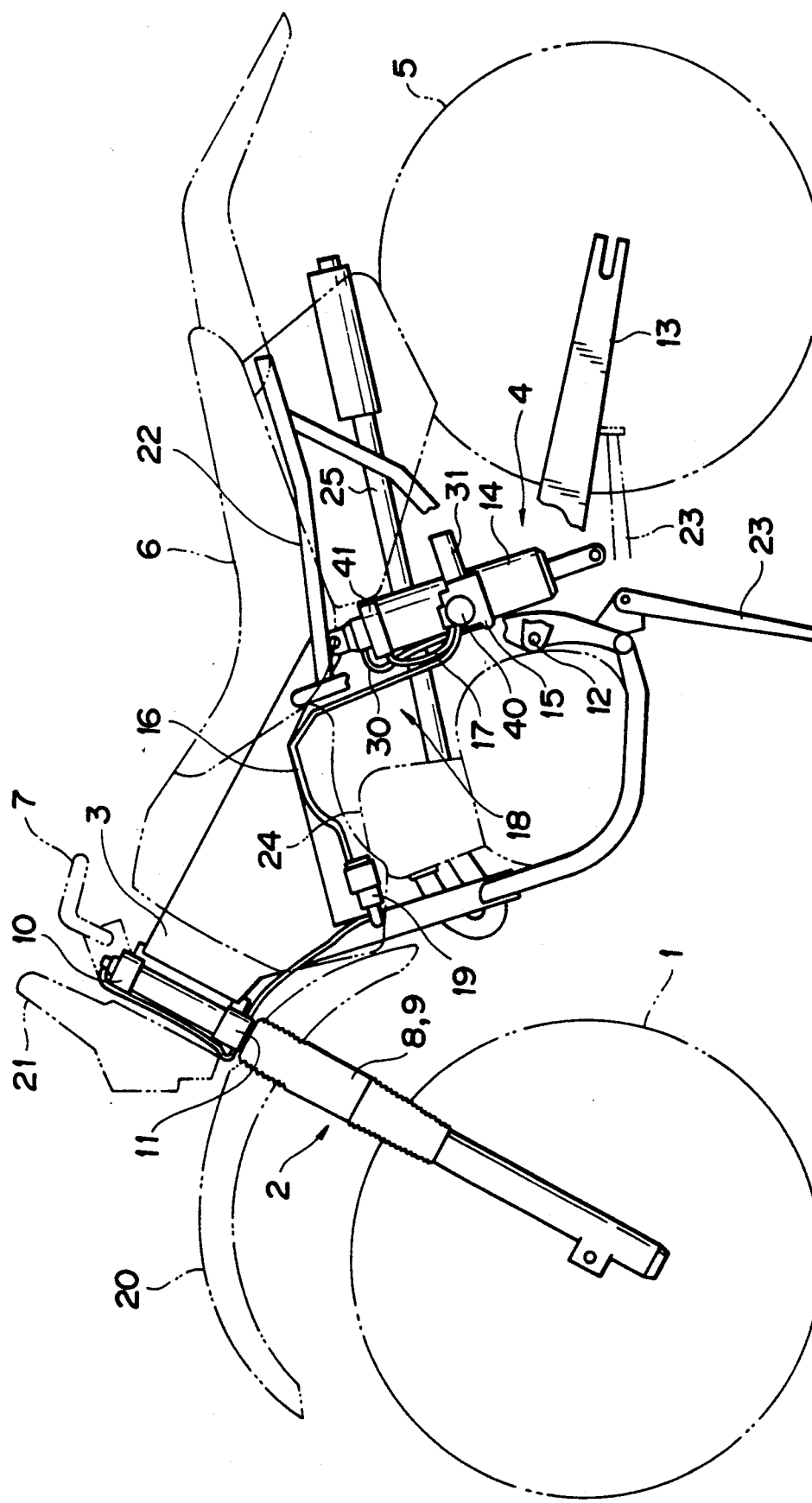
FIG. 1 is a side view of the whole of a motorcycle to which a body height adjustor according to this invention is assembled.

First, referring to FIG. 1, a front fork 2 for supporting a front wheel 1 is disposed in front of a body frame 3, and a rear wheel 5 supported by a rear suspension 4 is disposed at the rear portion of the body frame 3. A seat 6 is disposed on the body frame 3. The rider sits on the seat 6 while operating a handle bar 7 and driving the motorcycle.

The front fork 2 is an inverted type front fork formed of a pair of left and right front suspensions 8 and 9. The front suspensions 8 and 9 are supported by an upper bracket 10 and an under bracket 11 on the body frame 3 through an unillustrated steering shaft and a head pipe. The front suspensions 8 and 9 absorb shock from the front wheel 1 and attenuate the vibration thereof.

The rear suspension 4 has a swing arm 13 on which the rear wheel 5 is axially supported and which is supported by a pivot 12 on the body frame 3, a rear cushion unit 14 supported at its upper end on the body frame 3 and its lower end on the swing arm 13 through a link mechanism (not shown). The rear cushion unit 14 absorbs up-down swinging of the swing arm 13 on the pivot 12 to attenuate the vibration of this motion and to thereby reduce shock from the rear wheel 5.

Hydraulic jacks 42 and 41 (described later) are formed on the front suspensions 8 and 9 and the rear cushion unit 14, respectively, and a body height adjusting unit 15 is disposed in the vicinity of the rear cushion unit 14. The hydraulic jacks 42 of the front suspensions 8 and 9 and the body height adjusting unit 15 are connected by motorcycle front side hydraulic hoses 16 while the hydraulic jack 41 of the rear cushion unit 14 and the body height adjusting unit 15 are connected by a motorcycle rear side hydraulic hose 17, thereby forming a body height adjustor 18. A hose connector 19 is provided in the line of the motorcycle front side hydraulic hoses 16.

In FIG. 1, a reference numeral 20 designates a front fender, a reference numeral 21 is a head lamp housing, a reference numeral 22 is a seat rail on the body frame 3, a reference numeral 23 is a side stand, a reference numeral 24 is an engine, and a reference numeral 25 is an exhaust pipe connected to the engine 24.

Figure 3:
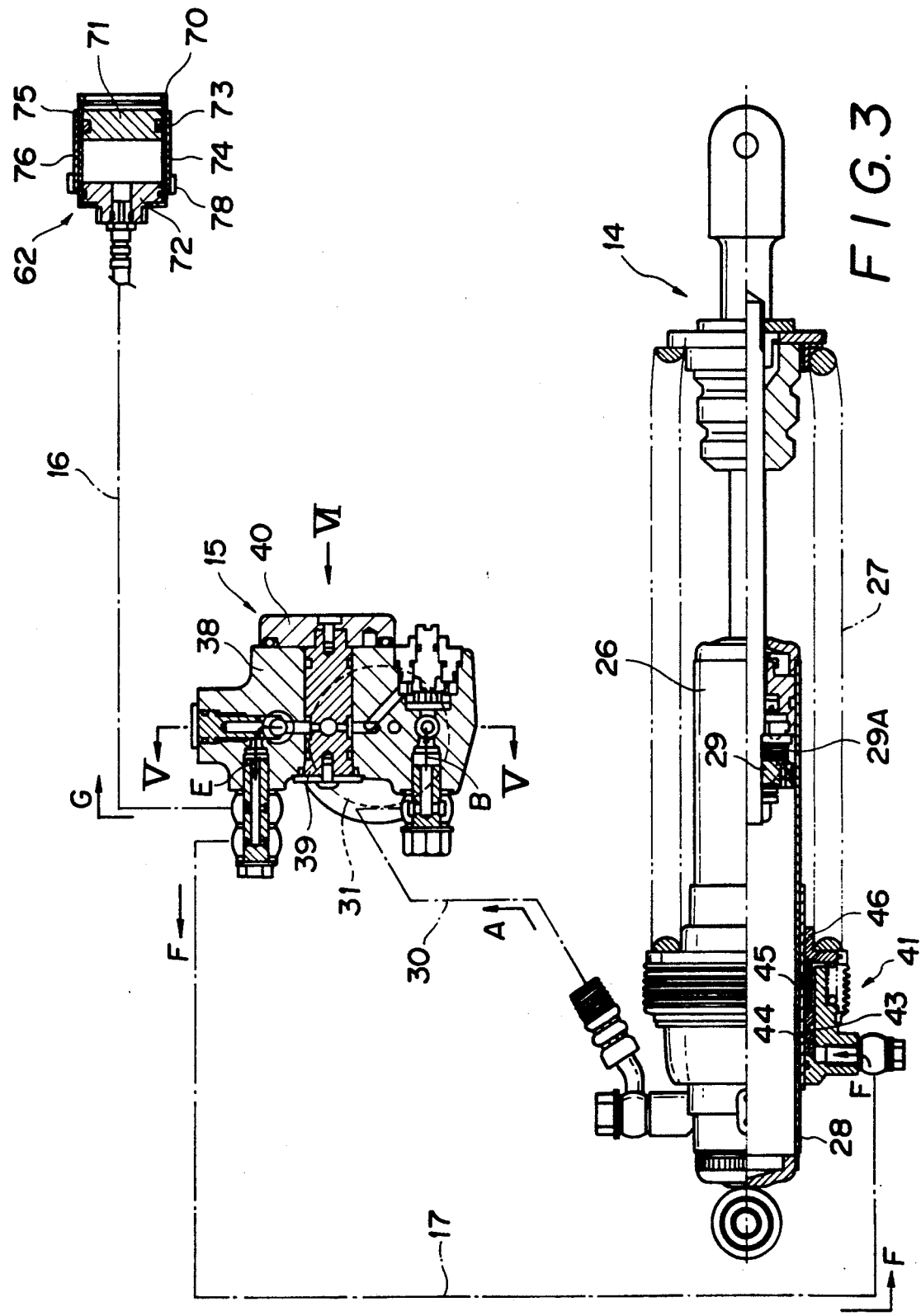
FIG. 3 is a cross sectional view of a rear cushion unit and the body height adjusting unit of FIG. 1 and other associated members.

As shown in FIG. 3, in the rear cushion unit 14, a coil spring 27 is wound around a rear oil damper 26. The rear oil damper 26 rapidly attenuates the vibration of the coil spring 27 by the resistance to a pressure oil contained its cylinder 28 which resistance is caused when the pressure oil flows through small holes of a piston 29 and a valve 29A. For control of the amount of pressure oil in the cylinder 28, the interior of the cylinder 28 communicates with an oil chamber 32 of a reserve tank 31 shown in FIGS. 5 and 6 through a connection hose 30 and an oil passage of the body height adjusting unit 15. The interior of the reserve tank 31 is sectioned by a piston 33 into the oil chamber 32 and an air chamber 34.

Figure 4:
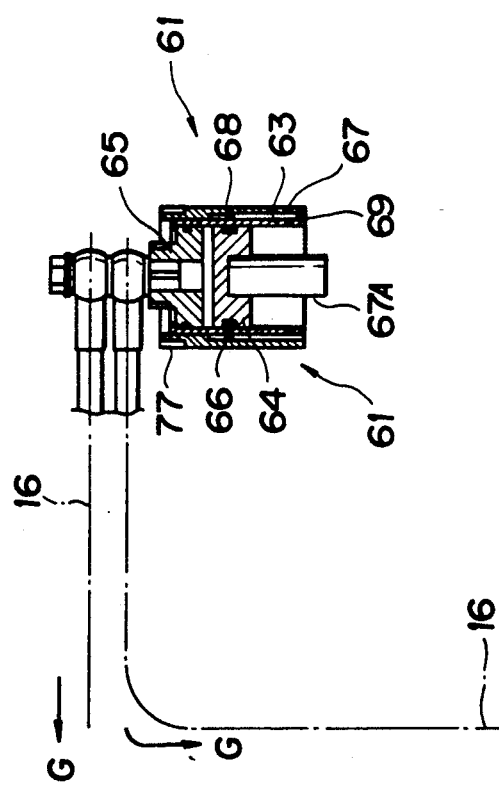
FIG. 4 is a cross sectional view of a front suspension of FIG. 1 and other associated members.
Figure 4:
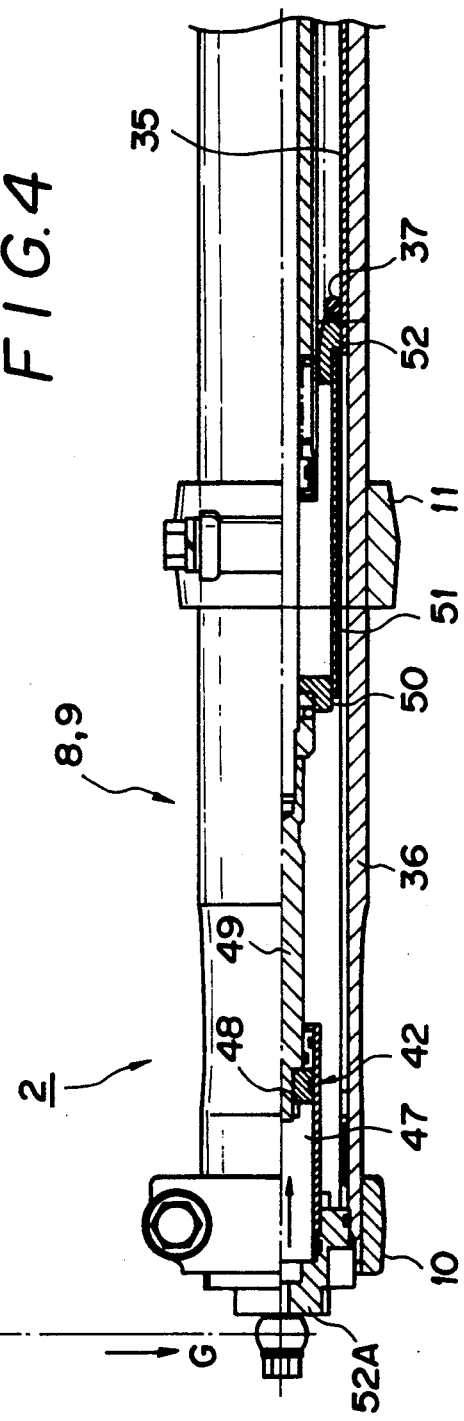

Each of the front suspensions 8 and 9 shown in FIG. 4 is constituted by an inner tube 35 supported on the front wheel 1 and an outer tube 36 incorporating a front oil damper. The front oil damper rapidly attenuates the vibration of a spring 37 disposed in the inner tube 35.

Figure 5:
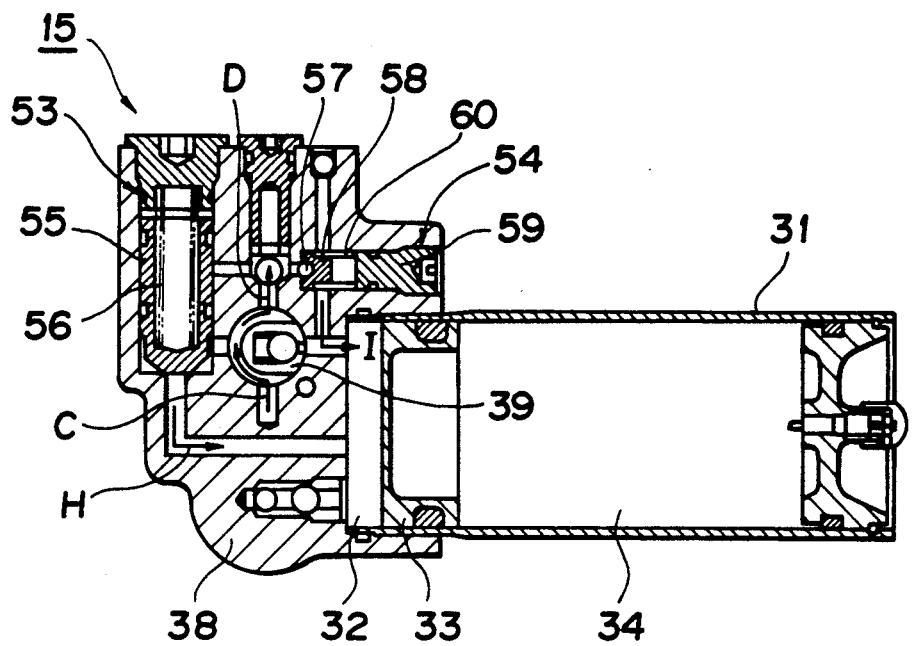
FIG. 5 is a sectional view taken along the line V—V shown in FIG. 3.
Figure 6:
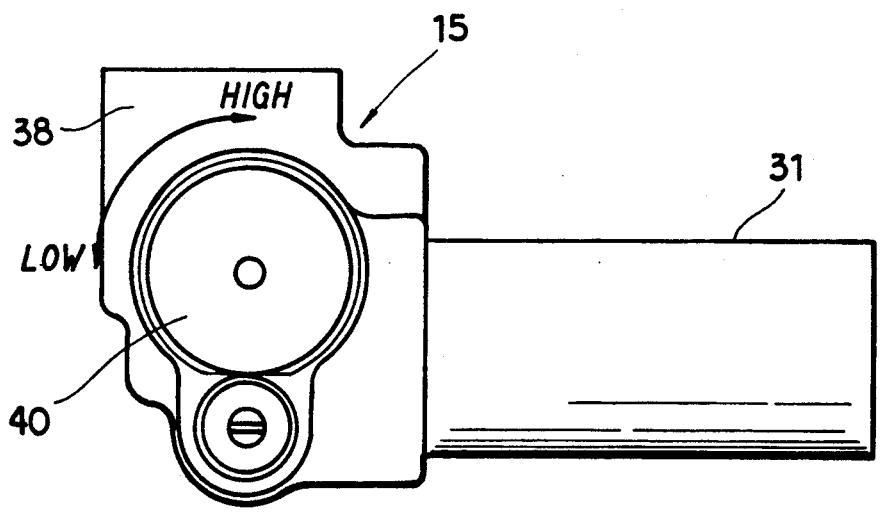
FIG. 6 is a view in the direction of arrow VI—VI of FIG. 3.
Figure 7:
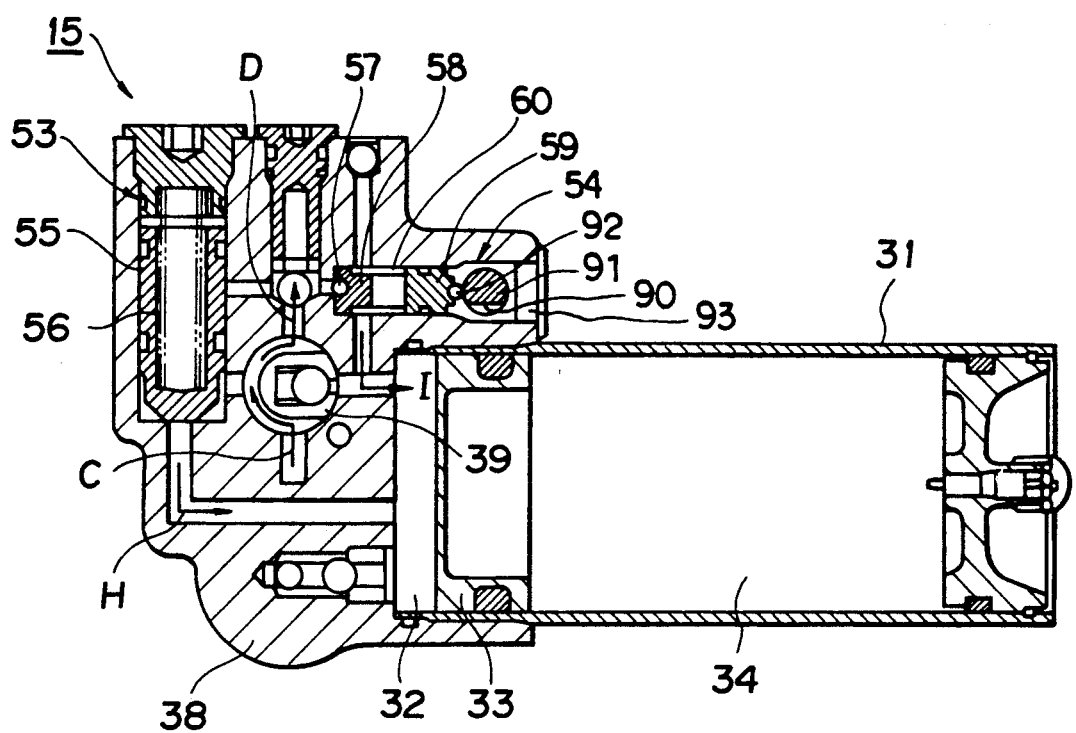
FIG. 7 is a view similar to that shown in FIG. 5 but provided with some additional members.

As shown in FIGS. 3 and 5 or 7, the body height adjusting unit 15 has a rotary valve 39 which is rotatably disposed at the center of an adjusting unit body 38, and to which the adjusting operation member 40 shown in FIG. 6 is integrally connected. The rotary valve 39 is changed over by the operation of rotating the adjusting operation member 40 to a high side to increase the body height or to a low side to reduce the body height.

That is, when the rotary valve 39 is changed over to the high side by the operation of the adjusting operation member 40, the piston 29 in the oil damper 26 shown in FIG. 3 is moved upward and downward by swinging the swing arm 13, so that the pressure oil contained in the cylinder 28 flows as indicated by the arrows A and B of FIG. 3, the arrows C and D of FIG. 5 and the arrow E of FIG. 3, and flows into the hydraulic jack 41 of the rear cushion unit 14 through the motorcycle rear side hydraulic hose 17, as indicated by the arrow F of FIG. 3. The pressure oil flowing as indicated by the arrow E in the body height adjusting unit 15 also flows into a joint 62 of the hose connector 19 on the body height adjusting unit side through the motorcycle front side hydraulic hoses 16, as indicated by the arrow G. The hydraulic pressure of this pressure oil is transmitted to the hydraulic jacks 42 of the front suspensions 8 and 9 shown via a joint 61 on the front fork side shown in FIG. 4.

The hydraulic jack 41 has, as shown in FIG. 3, a jack piston 44 disposed inside a jack cylinder chamber 43. The extent of movement of the jack piston 44 is transmitted to a spring guide 46 through a spacer 45 to change the initial load on the spring 27. Accordingly, as the pressure oil flows into the jack cylinder chamber 43 of the hydraulic jack 41 from the body height adjusting unit 15, the jack piston 44 is moved to press the spring guide 46 downward, and the rear cushion unit is thereby extended to increase the body height.

Each of the hydraulic jacks 42 of the front suspensions 8 and 9 has, as shown in FIG. 4, a jack piston 48 disposed inside a jack cylinder chamber 47 formed in the outer tube 36. The extent of movement of the jack piston 48 is transmitted to a spring guide 52 through a plunger 49, a ring 50 and a spacer 51. The two motorcycle front side hydraulic hoses 16 are connected to fork caps 52A of the left and right front suspensions to introduce the pressure oil contained in the motorcycle front side hydraulic hoses 16 into the jack cylinder chambers 47. When the hydraulic pressure of the pressure oil is transmitted to each hydraulic jack 42 through the hose connector 19, the jack piston 48 is moved downward and the spring guide 52 thereby depresses the spring 37 to increase the initial load on the spring 37, so that the front suspensions 8 and 9 are extended to increase the body height.

To reduce the body height, the adjusting operation member 40 is rotated to change over the rotary valve 39 to the low side. Then the pressure oil in the hydraulic jack 41 of the rear cushion unit 14 (refer to FIG. 3) is returned to the oil chamber 32 of the reserve tank 31 via the motorcycle rear side hydraulic hose 17 and the oil passage in the body height adjusting unit 15 by the weight of the motorcycle body. The pressure oil in each of the hydraulic jacks 42 of the front suspensions 8 and 9 (refer to FIG. 4) is returned to the joint 61 of the hose connector 19 on the front fork side by the weight of the motorcycle body. The pressure oil in the joint 62 on the body height adjusting unit side is thereby returned to the oil chamber 32 of the reserve tank 31 through the body height adjusting unit 15. The initial loads on the coil spring 27 of the rear cushion unit 14 and the coil springs 37 of the front suspensions 8 and 9 are thereby reduced so that the rear cushion unit 14 and the front suspensions 8 and 9 are contracted, thereby reducing the body height.

In the adjusting unit body 38, first blow valve 53 and a second blow valve 54 are provided as shown in FIG. 5. The first blow valve 53 has a piston 55 and a spring 56 for urging the piston 55. In the first blow valve 53, the piston 55 moves upward against the urging force of the spring 56 to discharge a part of the pressure oil into the oil chamber 32 of the reserve tank 31, as indicated by the arrow H, if the pressure of the pressure oil flowing into the body height adjusting unit from the rear oil damper 26 via the communication hose 30 (refer to FIG. 3) becomes equal to or higher than a predetermined pressure at the time of changeover of the rotary valve 39 to the high side.

In the second blow valve 54, a ball 57 is loosely fitted in a push piece 58, and a spring 60 is provided between the push piece 58 and a spring guide 59 which is screwed into the adjusting unit body 38. If the motorcycle jumps during running in a state where the rotary valve 39 is in the high changeover position and if the hydraulic pressure of the pressure oil in the hydraulic jack 41 of the rear cushion unit 14 and that of the pressure oil in the hydraulic jacks 42 of the front suspensions 8 and 9 are thereby increased, the ball 57 moves against the urging force of the spring 60 so that the pressure oil in the motorcycle front side hydraulic hoses 16 and the motorcycle rear side hydraulic hose 17 is returned to the oil chamber 32 of the reserve tank 31, as indicated by the arrow I, thereby preventing the hydraulic hoses 16 and 17 from being damaged.

Figure 2:
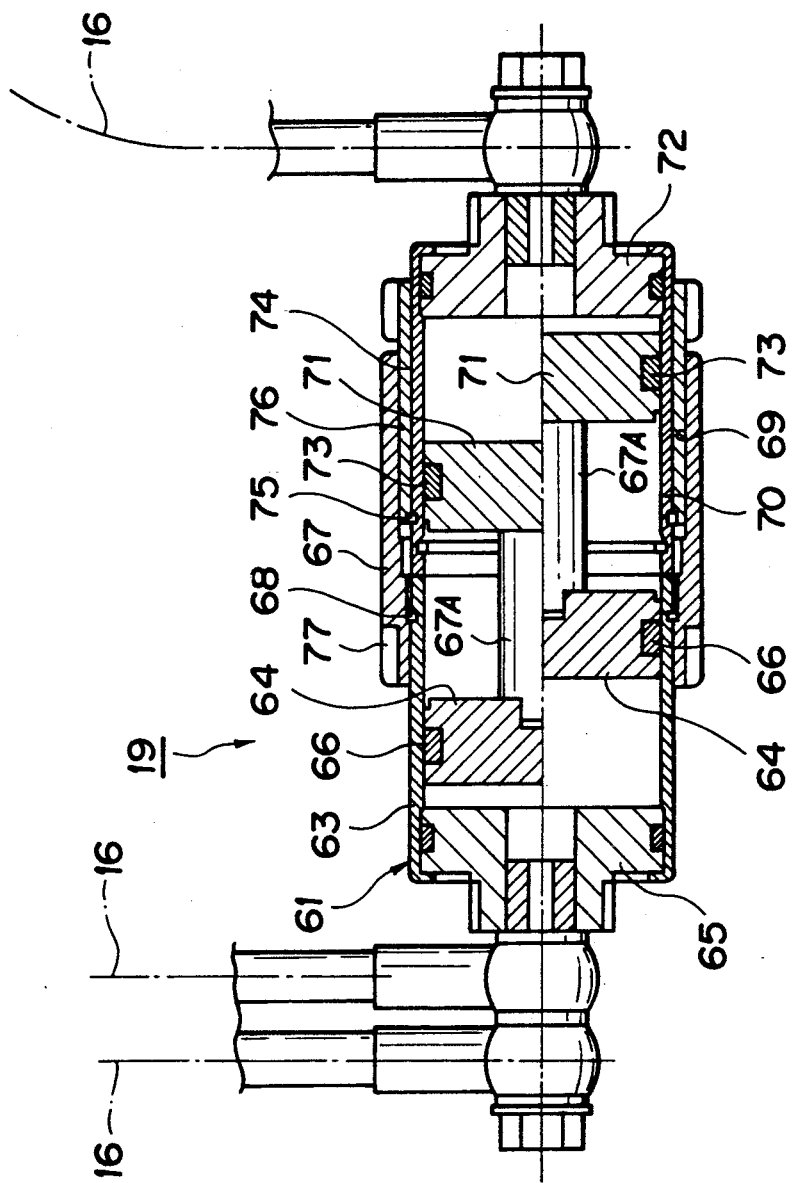
FIG. 2 is a cross sectional view of a hose connector of the body height adjustor according to one embodiment of this invention.

The hose connector 19 provided for the hydraulic hoses 16 is constituted by the joint 61 on the front fork side and the joint 62 on the body height adjusting unit side, as shown in FIGS. 4, 3, and 2.

In the joint 61 on the front fork side, a free piston 64 is slidably disposed in a cylinder 63, and a hose connecting member 65 is fixed to one end of the cylinder 63. The cylinder 63 is filled with the pressure oil. The two motorcycle front side hydraulic hoses 16 are connected to the hose connecting member 65 and to the respective hydraulic jacks 42 of the front suspensions 8 and 9. An oil seal 66 is disposed at an outer peripheral portion of the free piston 64 to prevent the pressure oil from leaking. A push rod 67A projects outward from the free piston 64.

Further, an outer cylinder 67 is loosely fitted on the outer peripheral surface of the cylinder 63. The position of the outer cylinder 67 is restricted in the longitudinal direction of the cylinder 63 by a ring 68 fixed on the cylinder 63. A female thread 69 is formed in an inner circumferential surface of a top end portion of the outer cylinder 67.

The joint 62 on the body height adjusting unit side is formed in substantially the same manner as the joint 61 on the front fork side. A free piston 71 is disposed in a cylinder 70 and the hose connecting member 72 is fixed to an end of the cylinder 70. One motorcycle front side hydraulic hose 16 is connected to the hose connecting member 72 and to the body height adjusting unit 15. An oil seal 73 is also disposed at the free piston 71. An outer cylinder 74 is loosely fitted on the outer peripheral surface of the cylinder 70. The position of the outer cylinder 74 is restricted by a ring 75, and a male thread 76 is formed in its top end portion.

Spanners (not shown) are fitted on nut portions 77 and 78 of the outer cylinders 67 and 74 and are operated to mesh the female thread 69 of the joint 61 on the front fork side with the male thread 76 of the joint 62 on the body height adjusting unit side, thereby connecting the joint 61 on the front fork side and the joint 62 on the adjusting unit side. In this connected state, the push rod 67A of the joint 61 on the front fork side abuts against the free piston 71 of the joint 62 on the adjusting unit side, and the free pistons 64 and 71 are integrally linked by the push rod 67A. Upper and lower half sections of FIG. 2 indicate the leftward and rightward movements of the free pistons 64 and 71, respectively.

In addition, as shown in FIG. 7, a body height adjusting shaft 91 provided with cam member 90 is disposed to be rotatable at the rear portion of the spring guide 59. A roller 92 is idly fitted to the rear surface of the spring guide 59 so as to engage with the outer periphery of the body height adjusting shaft 91 and the cam member 90. In FIG. 7, reference numeral 93 designates a cap.

Figure 8:
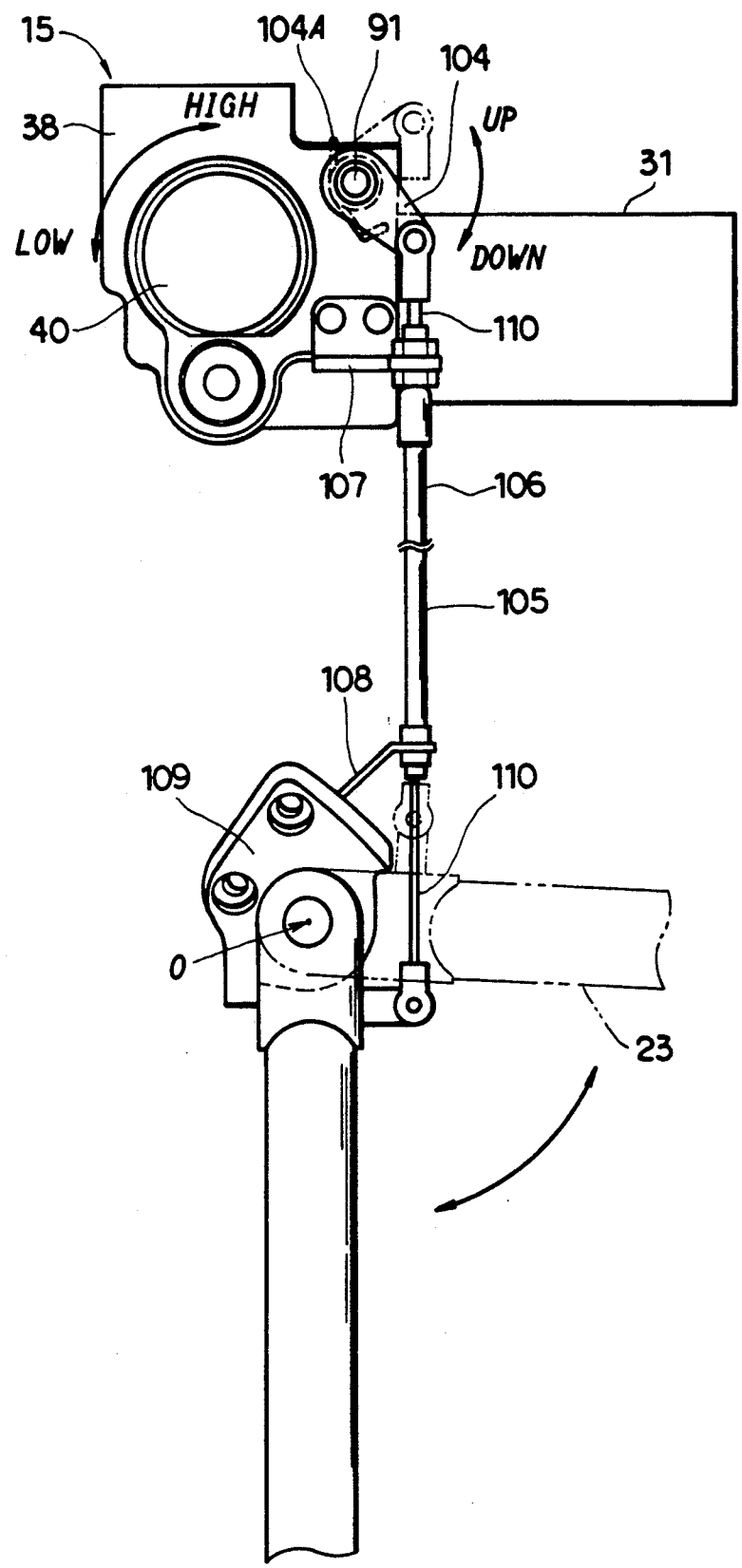
FIG. 8 is an enlarged view of a part of the body height adjusting unit shown in FIG. 7 in connection with the sidestand operating mechanism.

The second blow valve 54 has a further function of adjusting the body height by forcibly lowering the body height at the motorcycle stopping time. Namely, as shown in FIG. 8, an adjusting lever 104 is integrally secured to the body height adjusting shaft 91 and the adjusting lever 104 and the sidestand 23 are interconnected through a coupling cable 105, the in adjusting lever 104 being unenergized in "up" condition by a return spring 104A. The coupling cable 105 includes an outer cable 106 having an upper end connected to the body height adjusting unit 38 by means of a cable bracket 107 and a lower end secured to a sidestand bracket 109 by means of a cable bracket 108. The sidestand bracket 109 is disposed for the purpose of securing the sidestand 23 to the frame 3 of the motorcycle body and the point 0 is the center of the rotation of the sidestand 23 with respect to the sidestand bracket 109.

The coupling cable 105 also includes an inner cable 110 having an upper end secured to the adjusting lever 104 to be rotatable and a lower end positioned at a portion above the rotation center 0 in the "up" condition of the adjusting lever 104 as shown in FIG. 8 with a dot and dash line in consideration of a bank angle.

Accordingly, when the sidestand 23 is operated to its standing position as shown in FIG. 8 with a solid line, the adjusting lever 104 takes its "down" condition through the inner cable 110 of the coupling cable 105. At this moment, the body height adjusting shaft 91 is rotated to cause the cam member 90 to engage with the roller 92. Consequently, the spring guide 59, the spring 60, the push piece 58 and the ball 57 are moved towards the body height adjusting shaft 91, so that the pressure oil in the hydraulic hoses 16 and 17 is discharged into the oil chamber 32 of the reserve tank 31 as shown in the arrow I. In response to this operation, the pressure of the pressure oil in the hydraulic jacks 42 and 41 of the front suspensions 8 and 9 and the rear cushion unit 14 is lowered and hence, the initial loads of the front suspension units 8 and 9 and the rear cushion unit 14 are also lowered, whereby the body height of the motorcycle is lowered to the level at the time of switching the spool valve 39 to the "low" side.

According to the embodiment described above, the adjusting operation member 40 of the body height adjusting unit 15 is rotated to change over the spool valve 39 to the high side when the motorcycle travels on a rough ground or the like. The pressure oil in the rear cushion unit 14 is thereby supplied in a pressurized state to the hydraulic jack 41 of the rear cushion unit 14 and to the hydraulic jacks 42 of the front suspension units 8 and 9 via the body height adjusting unit 15 to increase the lengths of the rear cushion unit 14 and the front suspension units 8 and 9, thereby increasing the body height. For traveling on an urban road or the like, the rotary valve 39 of the body height adjusting unit 15 is changed over to the low side to discharge the pressure oil in the hydraulic jacks 41 and 42 and to thereby reduce the lengths of the rear cushion unit 14 and the front suspension units 8 and 9. The body height is thereby reduced so that the ground can be easily reached by the rider's feet.

The hose connector 19 provided for the motorcycle front side hydraulic hoses 16 can be separated into the joint 61 on the front fork side and the joint 62 on the body height adjusting unit side while preventing leakage of the pressure fluid. Therefore, when the front fork 2 including a part of the body height adjustor 18 is mounted on the body frame 3, the upper bracket 10 can be placed in the predetermined position without detaching or removing the fork caps 52A to which the motorcycle front side hydraulic hoses 16 are connected, thereby improving the facility with which the body height adjustor 18 is mounted.

Since there is no need for detaching the fork caps 52A, there is no risk of a change in the amount of pressure fluid in the front suspension units 8 and 9 and no risk of foreign matters being mixed therein.

If the joint 61 of the hose connector 19 on the front fork side and the joint 62 of this connector on the body height adjusting unit are separated, the front fork 2 and the rear cushion unit 14 can be mounted on the body frame 3 independently of each other at the time of mounting of the body height adjustor 18. Consequently, in a case where one of the front fork 2 and the rear cushion unit 14 is broken, only the broken unit can be detached for replacement. In addition, in a case where an oil leak takes place in one of the front fork 2 and the rear cushion unit 14, there is no risk of the oil leak influencing the other unit.

Furthermore, according to the preferred embodiment of this invention, the second blow valve 54 is opened in response to the standing operation of the sidestand 23 through the body height adjusting shaft 91, the adjusting lever 104 and the coupling cable 105 to thereby discharge the pressure oil in the hydraulic hoses 16 and 17 into the oil chamber 32 of the reserve tank 31. Accordingly, when the motorcycle, is stopped with the rotary valve 39 being switched to the "high" side by operating the adjusting unit 40, and the sidestand 23 is operated to be raised, the pressure of the pressure oil in the hydraulic jack 41 of the rear cushion unit 14 and the hydraulic jack 42 of the front suspension units 8 and 9 is lowered to thereby contract the rear cushion unit 14 and the front suspensions 8 and 9, thus lowering the body height of the motorcycle. The inclination of the motorcycle at the stopping time thereof decreases, thus improving the stopping stability of the motorcycle.

In another aspect, the second blow valve 54 is rotated at a time when the sidestand 23 is raised with the "low" side switched condition of the rotary valve 39 by the operation of the adjusting unit 40. However, in this condition, since the oil pressure in the hydraulic jacks 41 and 42 of the rear cushion unit 14 and the front suspensions 8 and 9 is lowered, the pressure oil in the hydraulic hoses 16 and 17 does not flow into the oil chamber 32 of the reserve tank 31 and the body height of the motorcycle can be maintained to a low attitude set by the switching "low" of the rotary valve 39. In this case, since the body inclination is small, the stopping stability of the motorcycle can be improved.

In addition, since the second blow valve 54 is rotated in response to the standing operation of the sidestand 23, the body height can be increased by positioning the sidestand 23 to its retracted state at the running time of the motorcycle with the rotary valve 39 being switched to the "high" side.

Accordingly, as described above, the body height of the motorcycle can be automatically adjusted to "high" or "low" state only by operating the sidestand 23 to its standing position or laying, i.e. retracted, position.

In another aspect, referring to FIG. 9, in the upper bracket 10, in the prior art construction the width l of a slit is usually of about 2 mm and accordingly, it is impossible to pass the hydraulic hose connected to the fork cap through the slit. For this reason, when the upper bracket is secured to or disassembled from the front suspensions it necessary to remove the fork caps 52A from the front suspensions, thus being troublesome as described hereinbefore.

In this regard, according to this invention, as shown in FIGS. 9A and 9B, the upper bracket is provided with front suspension support portions 111 as holes at the both end portions of the upper bracket 10, and slits 112 are formed from the front suspension support holes 111. Each slit 112 has a width of L so that the hydraulic hose 16 on the front side of the motorcycle can pass through the slit 112. For example, if the hose 16 has a diameter of about 8 mm, the slit 112 is formed so as to have the width L of about 10 mm. The slits 112 have two functions, one being to clamp the front suspensions 8 and 9 inserted into the front suspension support holes 111 by clamping bolts 116 and the other being to pass the hydraulic hoses 16 through the slits 112 by loosening the bolts 116. A hole 113 for passing the steering shaft is formed in substantially the central portion of the upper bracket 10.

After the front suspensions 8 and 9 are assembled in parallel by means of the under bracket 11, a steering shaft 114 is inserted into a head pipe 115 of the motorcycle body frame 3 and the upper bracket 10 is then secured to the front suspensions 8 and 9 and the upper portion of the steering shaft 114. At this time, the front suspensions 8 and 9 are inserted into the front suspension support holes 111 of the upper bracket 10 and clamped by the bolts 116. The front end of the steering shaft 114 is also inserted into the steering shaft insertion hole 113 and the inserted front end of the steering shaft 114 is screw clamped by a nut 117. In this manner, two front suspensions 8 and 9 are assembled with the frame 3 of the motorcycle body.

According to this structure, it is made possible to assemble or disassemble the front suspensions 8 and 9 with or from the upper bracket 10, whereby the assembling performance of the body height adjustor can be effectively improved. In addition, there is no need for removing the fork cap 52A, so that the air invading into the hydraulic hoses 16 at the assembling or disassembling of the front fork 2 can be substantially prevented, thus eliminating the air bleeding operation in the reassembling working.

It is to be understood that this invention is not limited to the described embodiment and many other changes and modifications may be made without departing from the scopes of the appended claims For example, according to this invention, the respective embodiments for the body height adjustment may be applied to a motorcycle alone or in combination thereof.

What is claimed is:

1. A motorcycle having a body adjustable in height, comprising:
    a pair of extendable front suspensions mounted to a front fork supported by a frame of a motorcycle body, said front fork supporting a front wheel in a shock absorbing manner;
    an extendable rear cushion unit supported by the body frame, said rear cushion unit supporting a rear wheel in a shock absorbing manner;
    an engine unit mounted to the body frame to drive and rotate the rear wheel; and
    a body height adjustor for adjusting the body height of the motorcycle by changing lengths of said front suspensions and said rear cushion unit, said body height adjustor including,
    first hydraulic jack means for extending and retracting said front suspensions;
    second hydraulic jack means for extending and retracting said rear cushion unit; and
    a body height adjusting unit for transmitting hydraulic pressure of hydraulic fluid in said rear cushion unit to said first and second hydraulic jack means through hydraulic hoses connected to hose connector means, said hose connector means comprises two parts, one being a front fork side joint member comprised of a piston-cylinder assembly and the other being a body height adjusting unit side joint member comprised of a piston-cylinder assembly, said piston-cylinder assemblies each including a cylinder and a free piston movable in the cylinder by the hydraulic pressure of the hydraulic fluid passing through the hydraulic hoses.

2. A motorcycle according to claim 1, wherein said pistons of both the joint members are integrally linked in operation by push rod means disposed in said cylinders.

3. A motorcycle according to claim 1, wherein said both joint members are connected by an outer cylinder mounted to said cylinders of the piston-cylinder assemblies.

4. A motorcycle having a body adjustable in height of the type maintaining a standing condition thereof by standing a sidestand, comprising:
    a pair of extendable front suspensions mounted to a front fork supported by a frame of a motorcycle body, said front fork supporting a front wheel in a shock absorbing manner;
    an extendable rear cushion unit supported by the body frame, said rear cushion unit supporting a rear wheel in a shock absorbing manner;
    an engine unit mounted to the body frame to drive and rotate the rear wheel; and
    a body height adjustor for adjusting the body height of the motorcycle by changing lengths of said front suspensions and said rear cushion unit, said body height adjustor including,
    first hydraulic jack means for extending and retracting said front suspensions;
    second hydraulic jack means for extending and retracting said rear cushion unit; and
    a body height adjusting unit for transmitting hydraulic pressure of hydraulic fluid in said rear cushion unit to said first and second hydraulic jack means through hydraulic hoses, said body height adjusting unit including a body height changeover valve means including a rotary valve and blow valve means operatively connected to said rotary valve and operated to be opened by increase of pressure in said hydraulic jack means and said hydraulic hoses, said blow valve means also being opened by operation of the sidestand.

5. A motorcycle according to claim 4, wherein said blow valve means includes first and second blow valves for discharging the hydraulic fluid in said hydraulic jack means and hydraulic hoses.

6. A motorcycle according to claim 4, wherein said blow valve means is provided with a body height adjusting shaft which is operatively connected to the sidestand through lever means and cable means.

7. A motorcycle according to claim 6, wherein said lever means comprises an adjusting lever having one end connected to said adjusting shaft and another end connected to one end of said cable means which has another end connected to the sidestand.

8. A motorcycle having a body adjustable in height, comprising:
- a pair of extendable front suspensions mounted to a front fork supported by a frame of a motorcycle body, said front fork supporting a front wheel in a shock absorbing manner and an upper bracket being mounted to said front fork;
- an extendable rear cushion unit supported by the body frame, said rear cushion unit supporting a rear wheel in a shock absorbing manner;
- an engine unit mounted to the body frame to drive and rotate the rear wheel; and
- a body height adjustor for adjusting the body height of the motorcycle by changing lengths of said front suspensions and said rear cushion unit, said body height adjustor including,
- first hydraulic jack means for extending and retracting said front suspensions;
- second hydraulic jack means for extending and retracting said rear cushion unit; and
- a body height adjusting unit for transmitting hydraulic pressure of hydraulic fluid in said rear cushion unit to said first and second hydraulic jack means through hydraulic hoses, said upper bracket being provided with front suspension support portions having slits each having a width sufficient for passing therethrough one of said hydraulic hoses.

9. A motorcycle according to claim 8, wherein said slits are adjusted by clamping or loosening bolt means mounted to a body of the upper bracket.

* * * * *